United States Patent [19]

Hall, Jr.

[11] 3,930,216

[45] Dec. 30, 1975

[54] METHOD OF MAKING GEOPHONES HAVING MATCHED SENSITIVITIES

[75] Inventor: Ernest M. Hall, Jr., Houston, Tex.

[73] Assignee: Walker-Hall-Sears, Inc., Houston, Tex.

[22] Filed: Apr. 1, 1974

[21] Appl. No.: 456,487

[52] U.S. Cl. .............................. 340/5 C; 73/1 DV
[51] Int. Cl.² ....................... G01V 1/00; H04B 13/00; H04R 15/00
[58] Field of Search .............. 340/5 C; 73/1 DV, 2; 29/593, 602; 335/284

[56] References Cited
UNITED STATES PATENTS

| | | | |
|---|---|---|---|
| 2,888,256 | 5/1959 | Sedgfield | 73/517 B |
| 3,303,398 | 2/1967 | Barta et al. | 335/284 |
| 3,545,564 | 12/1970 | Barber | 340/5 C |
| 3,738,445 | 6/1973 | Wilson et al. | 340/17 |

*Primary Examiner*—T. H. Tubbesing
*Assistant Examiner*—T. M. Blum
*Attorney, Agent, or Firm*—Michael P. Breston

[57] ABSTRACT

A method of mass producing geophones by adjusting their individual impulse response sensitivities. The method is carried out by impulsing each geophone, measuring its response, and incrementally magnetizing or demagnetizing the geophone as many times as may be required, until the geophone's impulse response sensitivity attains a desired value.

8 Claims, 2 Drawing Figures

METHOD OF MAKING GEOPHONES HAVING MATCHED SENSITIVITIES

BACKGROUND OF THE INVENTION

1. Field of the Invention

This invention relates to methods of producing geophones with matched impulse response sensitivities.

2. Description of Related Prior Art

Present-day geophone manufacturing methods produce geophones whose impulse response sensitivities have a total deviation of about ±10% for non-digital grade geophones and ±5% for digital-grade geophones. These tolerance variations have positive and negative values with respect to their respective mean reference values. The variations are caused by variations within the tolerances of the geophone's components, including: the magnetic properties of the magnet, the size of the magnetic air gap, the electric conductivity of the metallic parts, the mechanical dimensions of the parts, etc.

It will be appreciated that mass producing geophones with closely matched impulse response sensitivities, say on the order of 1% or less, only by tightening up the electrical and mechanical tolerances of the geophone's parts, is a difficult and at best an expensive job. There is, therefore, a need for a method of mass producing geophones with closely matched impulse response sensitivities by means which are not solely dependent on reducing the mechanical and electrical tolerances of the geophone's parts.

For land seismic exploration, geophones are used to manufacture multiple-geophone cables which are laid on the ground with the geophones firmly implanted into the ground. It is desired prior to "shooting" seismic energy into the ground, that defective geophones, or those that are improperly implanted, be detected and corrective measures taken or the geophones replaced. In cables having geophones with closely matched impulse response sensitivities, defective or poorly implanted geophones can be easily detected.

To obtain such multiple-geophone cables with closely matched impulse response sensitivities by using conventional manufacturing methods, the geophones are first impulse tested and then graded and sorted in accordance with their measured impulse response sensitivities. In a known such grading and sorting method, eleven "bins" were employed, one for each grade. The geophones in each bin have the desired closely-matched impulse response sensitivities, say ±1%.

The geophones assembled on a particular multiple-geophone cable are selected from particular bins such that the geophones having low-impulse sensitivities are matched with geophones having high-impulse sensitivities, causing the resultant combined sensitivity for the particular cable to fall within an allowed deviation sensitivity range.

The use of the multi-geophone cables must then continuously maintain in stock a supply of geophones for each particular bin. While maintaining in a warehouse a supply of eleven grades of geophones may not be too difficult a job, re-supplying a seismic field crew with eleven grades of geophones and obliging the crew to continuously maintain the geophones segregated, create difficult logistics, especially when the seismic crews operate in land areas to which access by regular means of transportation is severely restricted.

It is, therefore, a main object of the present invention to provide a method of manufacturing geophones all having closely matched impulse response sensitivities and all falling within one bin or grade, thereby eliminating the need for sorting the manufactured geophones into a plurality of bins.

SUMMARY OF THE INVENTION

In a preferred embodiment, each geophone is magnetically saturated and then incrementally demagnetized manually, or automatically, by using a servo loop. In another embodiment, each geophone is under-magnetized and then incrementally magnetized manually, or automatically, by using a servo loop.

In each embodiment, the method of adjusting the impulse response sensitivities of assembled geophones requires impulsing the coil of each geophone, measuring the impulse response of the coil, and magnetizing or demagnetizing and impulsively testing the geophone as many times as may be required to bring its impulse response sensitivity within a prescribed deviation range, whereby all the geophones will have impulse response sensitivities which are matched to very close tolerances, say on the order of ±1% or better.

Figure 1:
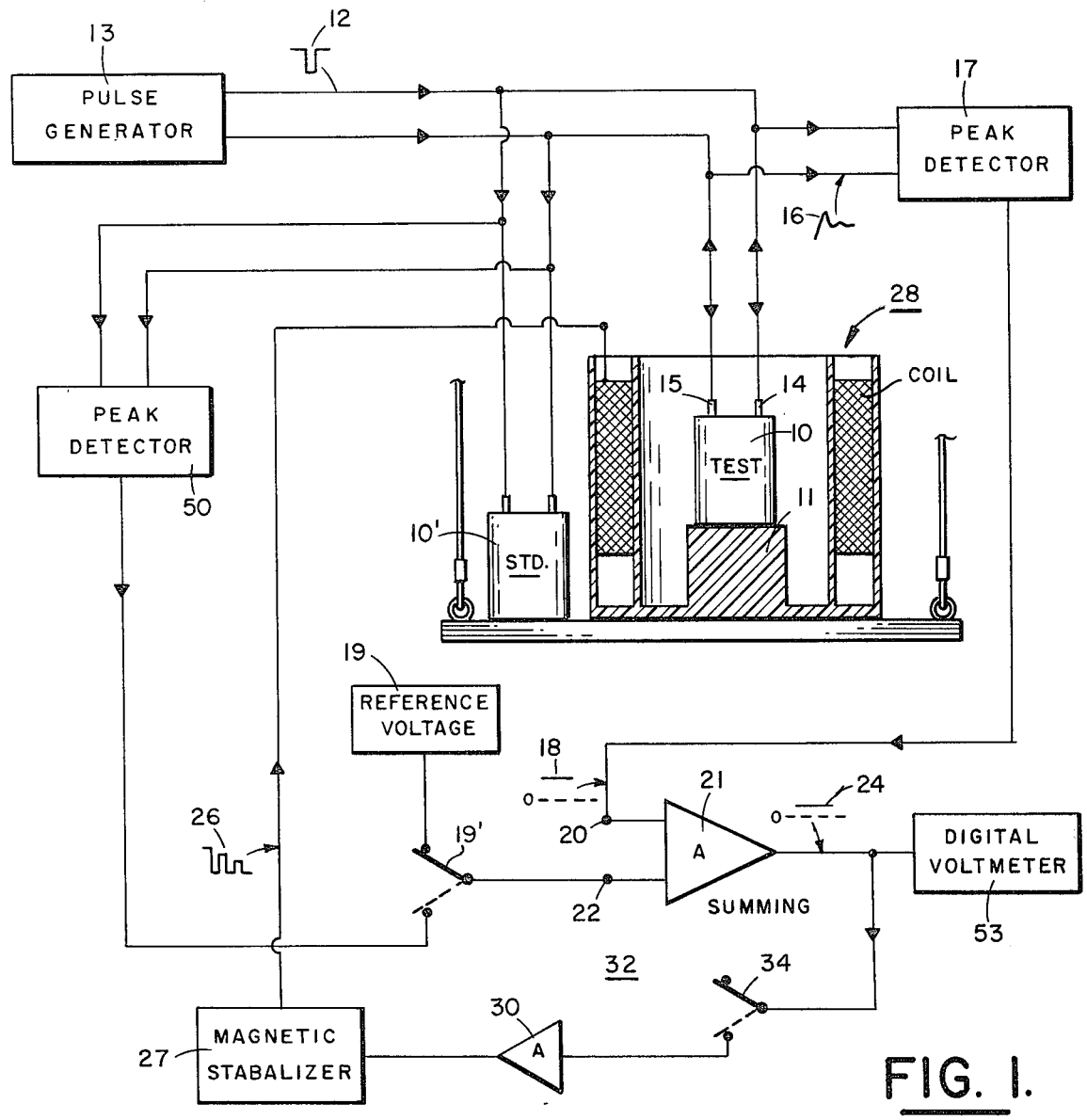
FIG. 1 is a block diagram of a system adapted to carry out the manual or automatic embodiments of the method of the invention.
Figure 2:
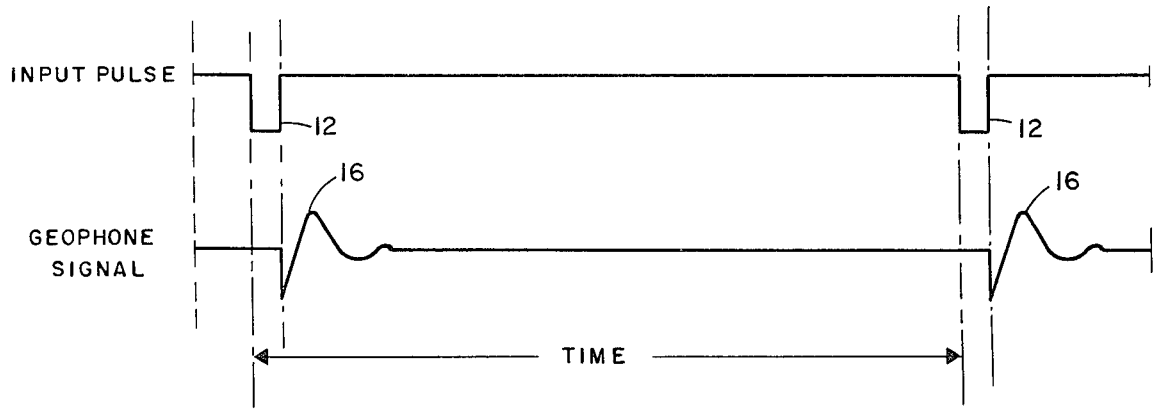
FIG. 2 shows typical impulses applied to and the response signals produced by the geophones using the system of FIG. 1.

A conventional electromagnetic geophone, as is well known, includes a mass-coil assembly concentrically suspended in an annular air gap established by a permanent magnet. The coil is wound on the outer wall of a coilform which serves as a rigid support for the coil. The mass-coil assembly is rigidly fixed in a magnetic casing. Vibrations of the earth are transferred to the magnet, thereby causing relative motion between the suspended coil and the magnetic field. This motion induces a signal in the coil which is proportional to the velocity of the coil relative to the magnetic assembly. Damping of the mass-coil assembly is achieved by making the coilform out of non-magnetic, conductive metal, or, as recently proposed, completely filling each geophone with a viscous damping liquid and using a plastic coilform. The geophone is typically also damped between 40 and 70% of critical with an external damping resistor. After the geophone is completely assembled, prior practice requires that the entire geophone be subjected to a strong saturating magnetic field. The geophone's impulse response sensitivity then depends on the electrical, magnetic and mechanical tolerances of the components within the geophone. Since these tolerances are relatively large, say ±5% for digital grade and ±10% for non-digital grade geophones, reducing the tolerances would be a difficult and expensive task.

To best carry out the method of the present invention, each geophone 10 to be operated upon is clamped to a solid block 11, preferably mounted on a suitable suspension, to prevent extraneous vibrations thereof. The geophone is then said to be in "seismic" isolation. Thereafter, geophone 10 is impulse tested, i.e., the geophone is impulsed with a suitable pulse 12 from a pulse-generator 13 applied to its terminals 14, 15. Pulse 12 may have a duration on the order of 1 ms. The geophone's coil (not shown) will become displaced in response to pulse 12. After removal of pulse 12, the coil will tend to return to its rest position and will produce a response signal whose peak voltage, preferably the first peak 16, is detected by a suitably-gated peak detector 17.

In the manual mode of operation of the method of this invention, the output DC voltage 18 of peak detector 17 is compared with a reference or standard DC voltage 19 of opposite polarity.

For example, voltage 18 of peak detector 17 can be applied to one input 20 of an algebraic summing amplifier 21, while reference voltage 19 is applied to a second input 22 through a switch 19'. The reference voltage 19 is made equal to a desired mean standard sensitivity. Summing amplifier 21 will provide an "error" output signal 24 whose magnitude and polarity correspond to the sensitivity deviation of geophone 10 from the desired standard sensitivity. The allowed deviation range will have a ± deviation of say ±1% from reference voltage 19.

If geophone 10 is found to have an impulse sensitivity outside the positive deviation of the desired standard sensitivity, then a short demagnetizing pulse 26 will be applied by a magnetic charger/stabilizer 27 to a magnetizing/demagnetizing fixture 28.

After this incremental demagnetization, geophone 10 will again be impulse tested, and if the DC output from summing amplifier 21 is still outside the permissible sensitivity deviation range, another demagnetizing pulse 26 will be applied to the demagnetizing fixture 28.

Geophone 10 will receive a demagnetization pulse 26 and will be impulse tested as many times as may be required until its impulse response sensitivity, as displayed, for example, on a digital voltmeter 53, is brought within the prescribed sensitivity deviation range.

If geophone 10 is found to have an impulse sensitivity outside the negative deviation of the desired standard sensitivity range, then a magnetizing pulse 26 will be applied by magnetic charger 27 to magnetizing fixture 28, The number of applied impulse tests and magnetizing pulses will be made sufficient to bring the geophone's sensitivity within the prescribed sensitivity range.

In the preferred embodiment of the present invention, each geophone 10 is first fully magnetized to saturation. The standard impulse response sensitivity is selected to be less than any anticipated impulse response sensitivity for any one of the geophones. Under these conditions, each geophone 10 should produce a positive error voltage 24 at the output of the summing amplifier 21. The magnetic stabilizer 27 will be manually triggered to apply one or more demagnetizing pulses 26 to fixture 28 to thereby incrementally demagnetize the geophone. After each application of a demagnetizing pulse, geophone 10 will be impulsively tested. The error voltage 24 from the summing amplifier 21 will become consecutively reduced until it reaches an acceptable value, as shown on the voltmeter 53. The application of a demagnetizing pulse and the impulse testing of geophone 10 may have to be repeated several times until the output error voltage 24 from the summing amplifier 21 falls within the desired, prescribed deviation range.

In the automatic mode of operation, the output error signal from the summing amplifier 21 is suitably amplified by an amplifier 30. The amplified error signal will automatically trigger the magnetic stabilizer 27. Geophone 10, peak detector 17, summing amplifier 21, amplifier 30, magnetic stabilizer 27, and demagnetizing fixture 28 all form a servo loop 32. The "automatic" servo loop mode can be selected by closing a normally open switch 34.

In a less preferred embodiment of the invention, after geophone 10 is assembled it is first insufficiently magnetized. Under these conditions the error voltage 24 from the output of the summing amplifier 21 will be negative. Either in the manual or in the automatic mode, a magnetizing pulse will be applied by magnetic charger 27 to magnetizing fixture 28 to thereby incrementally increase the magnetization of the magnet in the geophone. After each application of a magnetizing pulse, geophone 10 will be impulsively tested and the output error signal 24 from the summing amplifier 21 will become consecutively reduced in magnitude as observed on the digital voltmeter 53. The application of the magnetizing pulse and the impulse testing may have to be repeated several times by manually or automatically triggering charger 27, until the output 24 from the summing amplifier 21 falls within the prescribed sensitivity deviation range.

A magnetic charger and stabilizer 27 which can be used to carry out the method of this invention can be purchased from Thomas & Skinner, Inc. of Indianapolis, Indiana, Model MSC2. When operating as a magnetic stabilizer, this model provides a continuous chain of oscillating decaying pulses 26 which are applied to the demagnetizing fixture 28. Pulse magnitude can be varied from 0 to 700 volts and pulse rate can be varied from 30 to 100 pulses per minute. This versatility permits the precise control required for demagnetizing or stabilizing small magnets. Using this model, pulse rate, pulse rise and pulse polarity can be varied so as to produce a gradual step-by-step increase in the demagnetization process of the magnet in geophone 10 whose sensitivity is being adjusted.

In the charging or magnetizing mode of operation, each charging pulse (not shown) is clamped so that only single, uni-directional pulses are fed by charger 27 into the magnetizing fixture 28.

In all embodiments of the present invention, it is preferred to obtain the reference DC voltage not from a voltage source 19 but from a standard geophone 10'. Standard geophone 10' is also held together with geophone 10 in seismic isolation. In this embodiment, geophones 10 and 10' are simultaneously impulse tested. The impulse response of the standard geophone 10' is applied to another peak detector 50 whose output is fed through switch 19' (dotted position) to the second input 22 of summing amplifier 21.

Thus the output DC voltage from the second peak detector 50 serves the same function as the reference voltage 19. In all other respects, the process is the same. The main advantage in using a standard geophone 10' is that changes or drift in the input amplitude and/or width applied by generator 13 to both geophones 10 and 10' will tend to cancel each other out.

It will therefore be appreciated that the method of this invention will produce a single grade of geophones with accurately matched sensitivity responses, say ±1%, even though the geophones, before this method is applied to them, have sensitivity responses on the order of ±10%. With accurately matched geophones of this invention, accurately matched multi-geophone cables can now be assembled using a single grade of geophones.

Other advantages and variations in the method of this invention will readily become apparent to those skilled in the art.

What is claimed is:

1. A method of adjusting the impulse response sensitivity of a geophone having a coil mounted for movement relative to a permanent magnet, comprising:
   a. applying an electric impulse to the coil of the geophone to thereby displace the coil from a quiescent position;
   b. detecting the geophone's response signal to said impulse, said response signal being generated by said coil;
   c. producing an error signal by comparing said response signal with a reference signal; and
   d. applying a magnetic field to the magnet of the geophone, said magnetic field having an amplitude and polarity in dependence upon said error signal.

2. The method of claim 1, and
   repeating steps (a) through (d) as many times as required to make the magnitude of said error signal lie within a prescribed impulse response sensitivity deviation range.

3. A method of adjusting a geophone's impulse response sensitivity so that it falls within a prescribed sensitivity deviation range, said geophone having a coil mounted for movement relative to a permanent magnet, said method comprising:
   a. maintaining said geophone in seismic isolation;
   b. magnetizing the magnet of said geophone with a saturating magnetic field;
   c. applying an electric impulse to the coil of said geophone;
   d. detecting the voltage generated by the coil of said geophone;
   e. applying a demagnetizing magnetic field to the magnet of said geophone; and
   f. repeating steps (be) through (e) as many times as necessary until the geophone's impulse response sensitivity falls within said prescribed deviation range.

4. A method of producing a geophone having a coil movable relative to a permanent magnet so that said geophone has a prescribed impulse response sensitivity, comprising:
   a. maintaining the geophone in seismic isolation;
   b. magnetizing the magnet of said geophone;
   c. applying an electric impulse to the coil of said geophone;
   d. detecting the peak voltage generated by the coil of said geophone;
   e. comparing the detected voltage with a reference voltage to thereby produce a deviation voltage;
   f. incrementally magnetizing the magnet of said geophone; and
   g. repeating steps (b) through (f) as many times as necessary until the geophone attains said prescribed impulse response sensitivity.

5. A method of adjusting the impulse response sensitivity of an unknown geophone having a coil movable relative to a permanent magnet so that the geophone's impulse response sensitivity matches the impulse response sensitivity of a standard geophone, comprising:
   a. maintaining said unknown and said standard geophones in seismic isolation;
   b. applying an electric impulse to the coil of each of said geophones;
   c. detecting the response signal generated by the coil of each geophone;
   d. comparing the detected response signals to thereby produce a resultant signal;
   e. applying a magnetic field to the magnet of the unknown geophone; and
   f. repeating steps (b) through (e) as many times as necessary to thereby change said resultant signal to a prescribed value.

6. The method of claim 5, wherein said magnetic field is a demagnetizing magnetic field.

7. The method of claim 5, wherein said magnetic field is a magnetizing magnetic field.

8. The method of claim 5, wherein said magnetic field is applied automatically in response to said resultant signal.

* * * * *